United States Patent
Cai et al.

(10) Patent No.: US 11,509,824 B2
(45) Date of Patent: Nov. 22, 2022

(54) METHOD FOR TRACKING TARGET IN PANORAMIC VIDEO, AND PANORAMIC CAMERA

(71) Applicant: ARASHI VISION INC., Shenzhen (CN)

(72) Inventors: Jinlin Cai, Shenzhen (CN); Wenjie Jiang, Shenzhen (CN); Cong Chen, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 187 days.

(21) Appl. No.: 15/733,866

(22) PCT Filed: May 16, 2019

(86) PCT No.: PCT/CN2019/087274
§ 371 (c)(1),
(2) Date: Nov. 30, 2020

(87) PCT Pub. No.: WO2019/228196
PCT Pub. Date: Dec. 5, 2019

(65) Prior Publication Data
US 2021/0227132 A1    Jul. 22, 2021

(30) Foreign Application Priority Data
May 30, 2018 (CN) .......................... 201810541553.6

(51) Int. Cl.
*H04N 5/232*    (2006.01)

(52) U.S. Cl.
CPC ..... *H04N 5/23238* (2013.01); *H04N 5/23299* (2018.08)

(58) Field of Classification Search
CPC ............ H04N 5/23238; H04N 5/23299; G06T 3/0062; G06T 2207/30232; G06T 7/262
See application file for complete search history.

(56) References Cited

U.S. PATENT DOCUMENTS

| | | | |
|---|---|---|---|
| 2013/0002866 A1 | 1/2013 | Hampapur et al. | |
| 2013/0058532 A1* | 3/2013 | White | A63B 24/0003 382/103 |
| 2015/0139532 A1 | 5/2015 | Kim et al. | |

FOREIGN PATENT DOCUMENTS

| | | |
|---|---|---|
| CN | 104301669 A | 1/2015 |
| CN | 104751486 A | 7/2015 |

(Continued)

OTHER PUBLICATIONS

Taoming Zhang, "An Improved Kernelized Correlation Tracking Algorithm Based on Integral Channel Feature and Adaptive Learning Factor in Video Surveillance", Computer Measurement & Control, 2018, pp. 212-215, 219, vol. 26, Issue 3, China Academic Journal Electronic Publishing House.

*Primary Examiner* — Kathleen V Nguyen
(74) *Attorney, Agent, or Firm* — Cheng-Ju Chiang

(57) ABSTRACT

The present invention relates to the field of panoramic cameras, and provides a method for tracking a target in a panoramic video, and a panoramic camera. The method is used to track a target in a panoramic video on the basis of a multi-scale correlation filter, and employs automatic electronic pan-tilt-zoom technology. The present invention provides more robust tracking, faster processing speeds, a greater range of application in different tracking scenarios, and can be used to ensure that a tracked target is always at the center of the screen.

19 Claims, 1 Drawing Sheet

(56) References Cited

FOREIGN PATENT DOCUMENTS

| | | | |
|---|---|---|---|
| CN | 107025659 | A | 8/2017 |
| CN | 107093188 | A | 8/2017 |
| CN | 107315992 | A | 11/2017 |
| CN | 107452022 | A | 12/2017 |
| CN | 107507230 | A | 12/2017 |
| CN | 107862704 | A | 3/2018 |
| CN | 108848304 | A | 11/2018 |

* cited by examiner

METHOD FOR TRACKING TARGET IN PANORAMIC VIDEO, AND PANORAMIC CAMERA

CROSS REFERENCE TO RELATED APPLICATIONS

The present application is a 35 U.S.C. § 371 National Phase conversion of International (PCT) Patent Application No. PCT/CN2019/087274, filed on May 16, 2019, which claims priority of Chinese Patent Application No. 201810541553.6, filed on May 30, 2018, the disclosure of which is incorporated by reference herein. The PCT International Patent Application was filed and published in Chinese.

FIELD OF THE INVENTION

The present invention relates to the field of panoramic camera, and particularly relates to a method for tracking target in panoramic video, and a panoramic camera.

BACKGROUND OF THE INVENTION

Target tracking is a popular problem in computer vision research, which refers to, tracking and positioning objects by computers, cameras, etc. using a certain algorithm, and adopting corresponding strategies according to the position and movement of the target. In recent years, target tracking has been widely used in various fields such as video surveillance, video coding, and military engineering. The existing panoramic camera can capture 360-degree video around it, and there are also some technical solutions used for tracking target in the panoramic video, for example, the application Pub. No. CN107315992A discloses "a tracking method and device based on an electronic pan-tilt-zoom". However, this method is based on tracking feature points, and cannot track some scenes where the texture area has single color and the feature points are not abundant.

Technical Problem

The object of the present invention is to provide a method for tracking target in panoramic video, a computer readable storage medium and a panoramic camera, which aims to solve the problem that the existing panoramic camera cannot track some scenes where the texture area has single color and the feature points are not abundant.

Technical Solutions

According to a first aspect, the present invention provides a method for tracking target in panoramic video, comprising steps of:

S201, initializing a position and scale of a tracked target in a spherical coordinate system, calculating an electronic pan-tilt-zoom parameter, and mapping a panoramic image to a current electronic pan-tilt-zoom perspective image;

S202, on the basis of a multi-scale correlation filter, performing target tracking on the current electronic pan-tilt-zoom perspective image, and obtaining a new position and scale of the tracked target;

S203, mapping the new position of the tracked target back to the spherical coordinate system; and S204, calculating an electronic pan-tilt-zoom parameter on the basis of the new position and scale of the tracked target in the spherical coordinate system, mapping the same to the current electronic pan-tilt-zoom perspective image, and obtaining a new video frame; then returning to S201 until the panoramic video ends.

According to a second aspect, the present invention provides a computer-readable medium that stores one or more computer programs, one or more processors execute the one or more computer programs to perform the above-mentioned steps of the method for tracking target in panoramic video.

According to a third aspect, the present invention provides a panoramic camera, comprising:

one or more processors;

a memory; and one or more computer programs; wherein the one or more computer programs are stored in the memory and are configured to be executed by the one or more processors, that when the one or more processors execute the one or more computer programs, can perform the above-mentioned steps of the method for tracking target in panoramic video.

Advantages

In the present invention, the method tracks a target in a panoramic video on the basis of a multi-scale correlation filter, can provide more robust tracking, greater range of application in different tracking scenarios, and faster processing speed; in addition, due to the automatic electronic pan-tilt-zoom technology, the tracking target can always be in the center of the screen.

DESCRIPTION OF THE INVENTION

The foregoing objects, technical solutions and advantages of the invention will be much clearer from the following detail description taken with the accompanying drawings and embodiments. It should be understood that the specific embodiments described herein are only used to explain the present invention and are not intended to limit the present invention.

In order to explain the technical solutions of the present invention, the following will be described by specific embodiments.

First Embodiment

Figure 1:
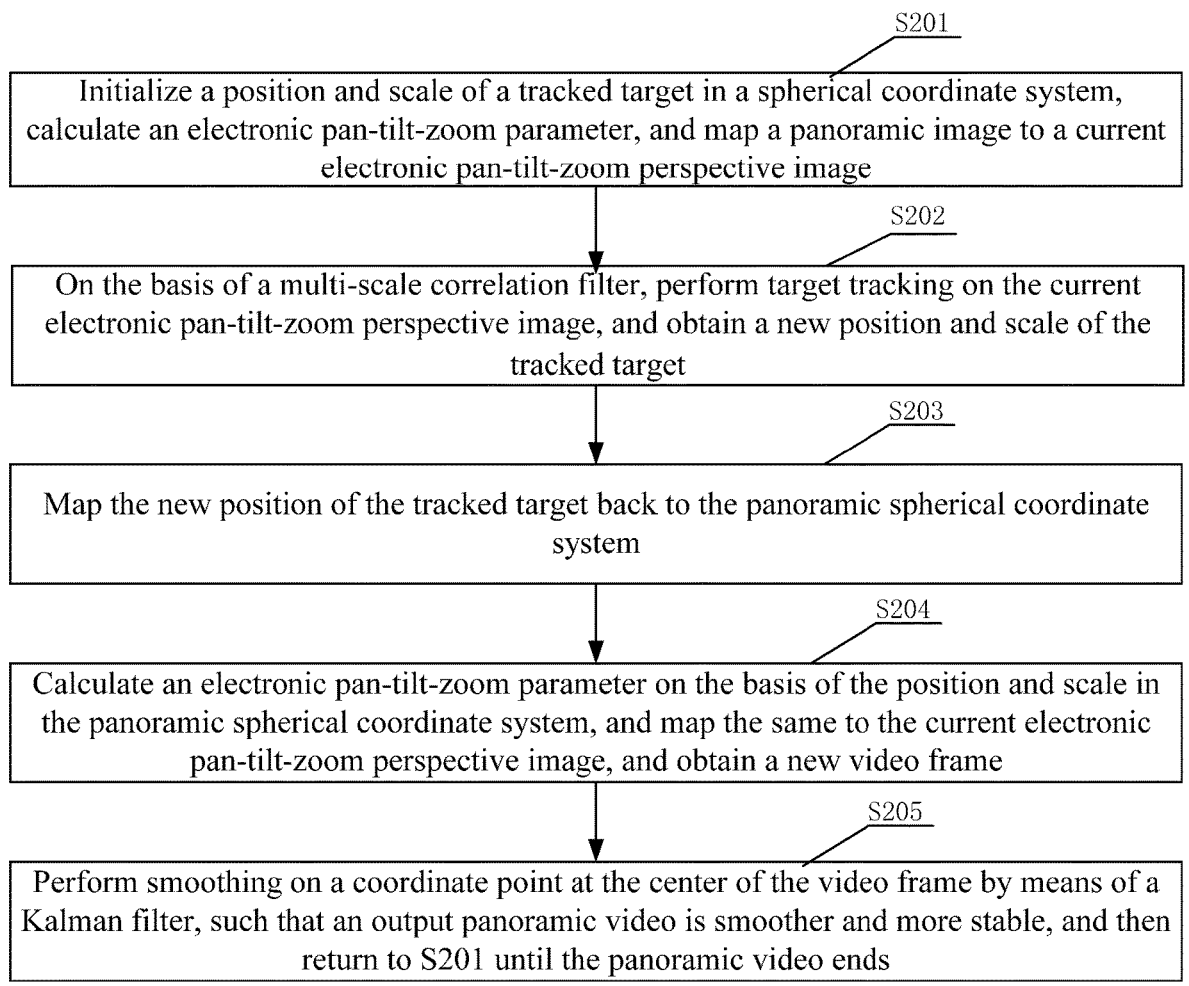
FIG. 1 is a flowchart of a method for tracking target in panoramic video in accordance with a first embodiment of the present invention.

Referring to FIG. 1, a method for tracking target in panoramic video provided in the first embodiment of the present invention, comprises the following steps. It should be noted that if there are substantially the same results, the method for tracking target in panoramic video of the present invention is not limited to the sequence of steps shown in FIG. 1.

S201, initializing a position and scale of a tracked target in a spherical coordinate system, calculating an electronic pan-tilt-zoom parameter, and mapping a panoramic image to a current electronic pan-tilt-zoom perspective image, that is, the current partial perspective view;

S202, on the basis of a multi-scale correlation filter, performing target tracking on the current electronic pan-tilt-zoom perspective image, and obtaining a new position and scale of the tracked target;

S203, mapping the new position of the tracked target back to the spherical coordinate system;

S204, calculating an electronic pan-tilt-zoom parameter on the basis of the new position and scale of the tracked target in the spherical coordinate system, mapping the same to the current electronic pan-tilt-zoom perspective image, and obtaining a new video frame; then returning to S201 until the panoramic video ends.

In the first embodiment of the present invention, after the step of obtaining a new video frame, the method may further comprise the following step of:

S205, performing smoothing on a coordinate point at the center of the video frame by means of a Kalman filter, so as to make the output panoramic video more stable.

In the first embodiment of the present invention, S201 can specifically comprise the following steps of S2011 to S2015.

S2011, initializing a position and scale of the tracking target in a spherical coordinate system.

S2012, rotating a virtual camera to a viewing angle of the tracking target through the electronic pan-tilt-zoom (ePTZ), adjusting the focal length of the virtual camera, and obtaining an initial ePTZ parameter $$\begin{bmatrix} \tilde{\theta}_0 \\ \tilde{\varphi}_0 \\ \tilde{f}_0 \end{bmatrix}$$

which makes the virtual camera center aligned with the initialized position of the tracking target, where $\tilde{\theta}_0$ is used to control a up-down tilt of the virtual camera, $\tilde{\varphi}_0$ is used to control a left and right movement of the virtual camera, and $\tilde{f}_0$ is used to control zoom of the virtual camera.

Electronic pan-tilt-zoom technology refers to a technology that controls the view and zoom of the lens inside the camera through program settings. The electronic pan-tilt-zoom technology can simulate a PTZ camera to realize the camera's left and right movement, up and down tilt and zoom. Electronic pan-tilt-zoom technology comprises smoothing and predicting camera movement for tracking position.

S2013, according to the initial ePTZ parameter, remapping and transforming the panoramic image to the current ePTZ perspective image.

In the first embodiment of the present invention, S2013 can specifically comprise:

remapping and transforming the panoramic image to the current ePTZ perspective image by formula (1): $P_{i,j}^{ePTZ} = K_k \cdot R_k \cdot P_{u,v}^{world}$, where $P_{i,j}^{ePTZ}$, is the coordinate position of $P_{u,v}^{world}$ mapped to the electronic PTZ perspective image, $P_{u,v}^{world}$ is the three-dimensional coordinates on the unit circle transformed from the panoramic image coordinates; $P_{u,v}^{world} = R_k^{-1} \cdot K_k^{-1} \cdot P_{i,j}^{ePTZ}$ as formula (2), where $K_k$ is a perspective matrix of the virtual camera, $R_k$ is the coordinate system from the world coordinate system to the virtual camera:

$$K_k = \begin{bmatrix} \tilde{f}_k & 0 & c_x \\ 0 & \tilde{f}_k & c_y \\ 0 & 0 & 1 \end{bmatrix}, R_k = \Phi\left(\tilde{\theta} \cdot \begin{bmatrix} -\sin(\tilde{\varphi}) \\ \cos(\tilde{\varphi}) \\ 0 \end{bmatrix}\right) \cdot \Phi\left(\tilde{\varphi} \cdot \begin{bmatrix} 0 \\ 0 \\ 1 \end{bmatrix}\right),$$

$$\Phi(q) = I + \frac{\sin(\theta)}{\theta} \cdot X + 2\frac{\sin^2\left(\frac{\theta}{2}\right)}{\theta^2} \cdot X^2,$$

$$\theta = \|q\|,$$

$$X = \begin{bmatrix} 0 & -q_z & q_y \\ q_z & 0 & q_x \\ q_y & q_x & 0 \end{bmatrix}, q = \begin{bmatrix} q_x \\ q_y \\ q_z \end{bmatrix}$$

and the normalized spherical coordinate of the world coordinate system:

$$P_{u,v}^{world} = \begin{bmatrix} \cos(u) \cdot \cos(v) \\ \cos(u) \cdot \sin(v) \\ \sin(u) \end{bmatrix};$$

where $$P_{i,j}^{ePTZ} = \begin{bmatrix} x \\ y \end{bmatrix}$$

is the coordinates of $P_{u,v}$ on the imaging plane of the virtual camera; $\tilde{f}_k$ is used to control the zoom of the virtual camera; $c_x$, $c_y$ are the projection center of the virtual camera; u and v are the two-dimensional coordinates of the panoramic image, respectively normalized to [0, 2π], [0, 1π]; $P_{u,v}$ represents a point mapped from two-dimensional coordinates to three-dimensional coordinates; $q_x$, $q_y$ and $q_z$ are the three components of q; to simplify the formula $R_k$, substituting $$\tilde{\theta} \cdot \begin{bmatrix} -\sin(\tilde{\varphi}) \\ \cos(\tilde{\varphi}) \\ 0 \end{bmatrix} \text{ and } \tilde{\varphi} \cdot \begin{bmatrix} 0 \\ 0 \\ 1 \end{bmatrix}$$

for q, thus the formula can be derived; where θ only represents a parameter, here, θ=‖q‖ which has no specific meaning; substituting $$\tilde{\theta} \cdot \begin{bmatrix} -\sin(\tilde{\varphi}) \\ \cos(\tilde{\varphi}) \\ 0 \end{bmatrix}$$

for q in Φ(q), and then obtaining a calculation and derivation method of camera rotation amount $R_k$.

S2014, in the current ePTZ perspective image, receiving a position of the tracking target manually selected by the user.

In the first embodiment of the present invention, a position of the tracking target can be a rectangular frame $$rect_0 = \begin{pmatrix} p_0 \\ w_0 \\ h_0 \end{pmatrix}$$

of the tracking target, where $$p_0 = \begin{pmatrix} x_0 \\ y_0 \end{pmatrix}$$

represents the rectangular frame center of the initialized position of the tracking target, and $w_0$, $h_0$ represents a width and height of the rectangular frame of the tracking target, respectively; $x_0$ and $y_0$ are the coordinates of the rectangular frame center of the tracking target.

S2015, calculating the position and scale of the tracking target in the spherical coordinate system according to the position of the tracking target in the current ePTZ perspective image.

In the first embodiment of the present invention, S2015 can specifically comprise:

calculating the position and scale $$\begin{bmatrix} \theta_0 \\ \varphi_0 \\ s_0 \end{bmatrix}$$

of the tracking target in the spherical coordinate system by formula $$P_{u,v}^{world} = R_k^{-1} \cdot K_k^{-1} \cdot P_{i,j}^{ePTZ}, \text{ where } s_0 = \frac{f_0}{\alpha}, \alpha = \frac{f_0}{h_0},$$

$s_0$ is the scale of the tracking target currently detected, which can be expressed by a width of the tracking target; $f_0$ is the focal length of the virtual camera; $h_0$ is a height of the rectangular frame; $\tilde{\theta}_k$ is used to control the up-down tilt of the virtual camera; $\tilde{\varphi}_k$ is used to control the left and right movement of the virtual camera; $\tilde{f}_k$ is used to control the zoom of the virtual camera; $\tilde{\theta}_k$ and $\tilde{\varphi}_k$ are the initial vertical tilt angle and left and right movement of the virtual camera, respectively; $\theta_k$ and $\varphi_k$ are the calculated spherical coordinate of the tracking target; $\tilde{\theta}_k$ and $\tilde{\varphi}_k$ are the coordinate position of the viewpoint smoothed by the Kalman filter; $\theta_0$ and $\varphi_0$ are the initialized position of the tracking target, $\theta_0 = \tilde{\theta}_0$, $\varphi_0 = \tilde{\varphi}_0$, that is, the virtual camera is centered on the tracking target at the initialized position.

In the first embodiment of the present invention, S202 can specifically comprise the following steps of S2021 to S2026.

S2021, selecting a rectangular frame of the tracking target palming within the area of the tracking target to obtain a predetermined number of training samples to train a position tracking model.

In the first embodiment of the present invention, S2021 specifically comprises the following steps of:

converting the cost function (cost function refers to the function used to measure an error between a predicted value and a true value):

$$\varepsilon_k = \|\Sigma_{l=1}^d h_k^l \otimes f_k^l - g_k\|^2 + \lambda \Sigma_{l=1}^d \|h_k^l\|^2 \quad \text{formula (3)}$$

of the position tracking model to the Fourier domain:

$$E_k = \|\Sigma_{l=1}^d H_k^l F_k^l - G_k\|^2 + \lambda \Sigma_{l=1}^d \|H_k^l\|^2 \quad \text{formula (4), and}$$

calculating a solution $$H = \frac{\overline{G_k} F_k^l}{\sum_{l=1}^d \overline{F_k^l} F_k^l + \lambda}$$

of formula (4) using the gradient descent method;

where $f_k^l$ and $F_k^l$ respectively represent the Hog (Histogram of Oriented Gradient) feature and the corresponding Fourier domain feature of the first training sample of the tracking target at frame k; $g_k$ and $G_k$ respectively represent the Gaussian Process Regression matrix and the corresponding Fourier domain feature; d represents the number of samples; $\otimes$ represents convolution; $h_k^l$ and $H_k^l$ respectively represent a correlation filter coefficient and the corresponding Fourier domain feature at frame k; and $\lambda(\lambda \geq 0)$ represents the regularization coefficient, $\overline{G_k}$ represents the complex conjugate of $G_k$; and $\overline{F_k^l}$ represents the complex conjugate of $F_k^l$.

S2022, iteratively updating the parameters of the position tracking model according to the solution $H_k^l$ of the position tracking model;

in the first embodiment of the present invention, S2022 specifically comprises the following steps of:

according to the solution $$H = \frac{\overline{G_k} F_k^l}{\sum_{l=1}^d \overline{F_k^l} F_k^l + \lambda}$$

of the position tracking model, updating the parameters of the position tracking model as follows:

$$A_k^l = (1-\eta)A_{k-1}^l + \eta \overline{G_k} F_k^l$$

$$B_k = (1-\eta)B_{k-1} + \eta \Sigma_{l=1}^d \overline{F_k^l} F_k^l$$

where $A_0^l = \overline{G_0} F_0^l$, $B_0 = \Sigma_{l=1}^d \overline{F_0^l} F_0^l$ represent the parameters of the position tracking model at frame 0 (which represents the initialized position); $A_{k-1}^l$, $B_{k-1}$ represent the parameters of the position tracking model at frame k−1; $A_k^l$, $B_k$ represent the parameters of the position tracking model at frame k; and $\eta$ represents the learning rate, and represents the model update speed.

S2023, predicting a translational position of the tracking target according to the output position and scale of the current ePTZ and the parameters of the position tracking model;

in the first embodiment of the present invention, S2023 specifically comprises the following steps of:

predicting the ePTZ parameters of the next frame using the position of the tracking target at frame k−1, and calculating the plane position $$\begin{bmatrix} x \\ y \end{bmatrix}$$

and the scale $$s_k = \frac{f_k}{\alpha}$$

of the tracking target under the current ePTZ parameters by S2014;

by the following formula:

$$response_i = F^{-1}\left\{\frac{\sum_{l=1}^{d} A_k^l Z_k^l}{B_k + \lambda}\right\}$$

where $\lambda$ represents the regularization parameter (generally the value is 0.01); both $B_k$ and $A_k^l$ represent the model parameters of the tracking model at frame k (calculated in S2022); d represents the number of samples; $F^{-1}$ represents the Inverse Fourier transform; $Z_k^l$ represents the Fourier transform of the Hog feature of the tracking target area determined by the output position and scale of the ePTZ at frame k; $response_k$ represents a response graph of the tracking target at frame k, that is, the value of each point in the response graph is equal to the similarity between the sample and the tracking target; finding the position with the largest value in the response graph is to find the position most similar to the tracking target; thereby, a translational position of the tracking target being: $p_k$=findMax($response_k$).

S2024, obtaining training samples of a scale tracking model according to a scale change to increase or decrease the rectangular frame of the tracking target, and repeating S2021 to S2023 to obtain a scale $s_k$ of the correlation filtering;

in the first embodiment of the present invention, S2024 specifically comprises the following steps of:

by obtaining $f_k^l$ in the formula $\varepsilon_k = \|\sum_{l=1}^{d} h_k^l \otimes f_k^l - g_k\|^2 + \lambda \sum_{l=1}^{d} \|h_k^l\|^2$, that is, obtaining training samples of a scale tracking model according to a scale change to increase or decrease the rectangular frame of the tracking target, and repeating S2021 to S2023 to obtain a scale $s_k$ of the correlation filtering;

a scale change is that while keeping the translational position $p_k$ of the tracking target unchanged, the width and the height of the rectangular frame of the tracking target are multiplied by a coefficient to obtain a new rectangular area as a new sample; calculating a scale change by the following formula:

$$s_i = a^i w + a^i h \quad i \in \left\{-\frac{s-1}{2}, \frac{s-1}{2}\right\}$$

where, w refers to a width of the rectangular frame of the tracking target, h refers to a height of the rectangular frame of the tracking target, and S represents the number of scales, which is taken as 33 here; $\alpha$=1.01 represents a scale factor; a maximum similarity can be calculated at each scale, and comparing and finding the scale of the maximum similarity as the scale $s_k$ of the current tracking target.

S2025, obtaining a new rectangular frame of the tracking target according to the translational position $p_k$ and the scale $s_k$ of the tracking target;

the rectangular frame of the new tracking target is denoted as $$rect_k = \begin{pmatrix} p_k \\ w_{k-1} \cdot s_k \\ h_{k-1} \cdot s_k \end{pmatrix},$$

where $w_{k-1}$ and $h_{k-1}$ represent a width and a height of the rectangular frame of the tracking target in the frame k−1.

S2026, calculating the new position and scale of the rectangular frame $rect_k$ of the tracking target in the spherical coordinate system.

Second Embodiment

The second embodiment of the present invention provides a computer-readable storage medium that stores one or more computer programs, when one or more processors execute the one or more computer programs to perform the steps of the method for tracking target in panoramic video provided in the first embodiment.

Third Embodiment

Figure 2:
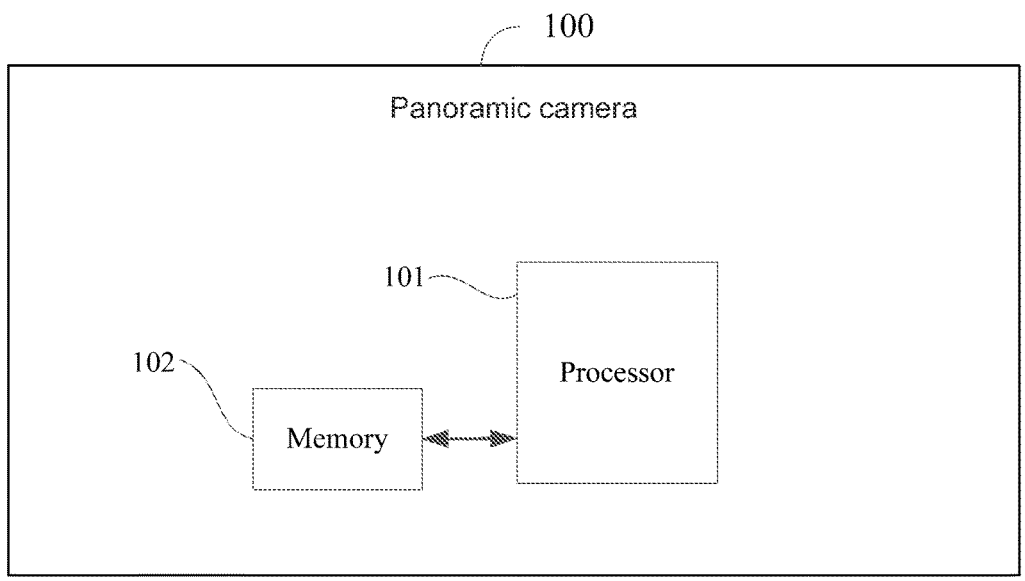
FIG. 2 is a schematic structural diagram of a panoramic camera in accordance with a third embodiment of the present invention.

FIG. 2 illustrates a structural block diagram of a panoramic camera provided in the third embodiment of the present invention. The panoramic camera 100 comprises: one or more processors 101, a memory 102, and one or more computer programs, where the one or more processors 101 and the memory 102 are connected by a bus, the one or more computer programs are stored in the memory 102, and are configured to be executed by the one or more processors 101. The one or more processors 101 execute the one or more computer programs to perform the steps of the method for tracking target in panoramic video provided in the first embodiment.

In the present invention, the method tracks a target in a panoramic video on the basis of a multi-scale correlation filter, can provide more robust tracking, greater range of application in different tracking scenarios, and faster processing speeds; in addition, due to the automatic ePTZ technology, the tracking target can always be in the center of the screen.

A person of ordinary skill in the art may understand that all or part of the steps in the method of the above-mentioned embodiments can be implemented by the one or more programs instructing the relevant hardware. The one or more programs can be stored in a computer-readable storage medium, and the storage medium can include: Read Only Memory (ROM), Random Access Memory (RAM), magnetic disk or optical disk, etc.

The above descriptions are only preferred embodiments of the present invention and are not intended to limit the present invention. Any modification, equivalent replacements and improvement made within the spirit and principle of the present invention shall be included in the protection of the present invention.

What is claimed is:

1. A method for tracking target in panoramic video, comprising steps of:

S201, initializing a position and scale of a tracked target in a spherical coordinate system, calculating an electronic pan-tilt-zoom parameter, and mapping a panoramic image to a current electronic pan-tilt-zoom perspective image;

S202, on the basis of a multi-scale correlation filter, performing target tracking on the current electronic pan-tilt-zoom perspective image, and obtaining a new position and scale of the tracked target;

S203, mapping the new position of the tracked target back to the spherical coordinate system; and S204, calculating an electronic pan-tilt-zoom parameter on the basis of the new position and scale of the tracked target in the spherical coordinate system, mapping the same to the current electronic pan-tilt-zoom perspective image, and obtaining a new video frame; then returning to S201 until the panoramic video ends.

2. The method of claim 1, wherein after obtaining a new video frame, the method further comprises the following step of:
S205, performing smoothing on a coordinate point at a center of the video frame by means of a Kalman filter, so as to make an output panoramic video more stable.

3. The method of claim 1, wherein S201 specifically comprises steps of:
S2011, initializing a position and scale of the tracking target in a spherical coordinate system;
S2012, rotating a virtual camera to a viewing angle of the tracking target through the electronic pan-tilt-zoom (ePTZ), adjusting the focal length of the virtual camera, and obtaining an initial ePTZ parameter $$\begin{bmatrix} \tilde{\theta}_0 \\ \tilde{\varphi}_0 \\ \tilde{f}_0 \end{bmatrix}$$

which makes the virtual camera center aligned with the initialized position of the tracking target, where $\tilde{\theta}_0$ is used to control a up-down tilt of the virtual camera, $\tilde{\varphi}_0$ is used to control a left and right movement of the virtual camera, and $\tilde{\theta}_0$ is used to control zoom of the virtual camera;
S2013, according to the initial ePTZ parameter, remapping and transforming the panoramic image to the current ePTZ perspective image;
S2014, in the current ePTZ perspective image, receiving a position of the tracking target manually selected by the user; and
S2015, calculating the position and scale of the tracking target in the spherical coordinate system according to the position of the tracking target in the current ePTZ perspective image.

4. The method of claim 3, wherein S202 specifically comprises steps of:
S2021, selecting a rectangular frame of the tracking target panning within the area of the tracking target to obtain a predetermined number of training samples to train a position tracking model;
S2022, iteratively updating the parameters of the position tracking model according to the solution of the position tracking model;
S2023, predicting a translational position of the tracking target according to an output position and scale of the current ePTZ and the parameters of the position tracking model;
S2024, obtaining training samples of a scale tracking model according to a scale change to increase or decrease the rectangular frame of the tracking target, and repeating S2021 to S2023 to obtain a scale of the correlation filtering;
S2025, obtaining a new rectangular frame of the tracking target according to the translational position and the scale of the tracking target; and
S2026, calculating the new position and scale of the rectangular frame of the tracking target in the spherical coordinate system.

5. The method of claim 4, wherein S2013 specifically comprises:

remapping and transforming the panoramic image to the current ePTZ perspective image by formula (1): $P_{i,j}^{ePTZ}=K_k \cdot R_k \cdot P_{u,v}^{world}$, $P_{i,j}^{ePTZ}$, where $P_{i,j}^{ePTZ}$ is the coordinate position of $P_{u,v}^{world}$ mapped to the electronic PTZ perspective image, $P_{u,v}^{world}$ is the three-dimensional coordinates on the unit circle transformed from the panoramic image coordinates $P_{u,v}^{world}= R_k^{-1} \cdot K_k^{-1} \cdot P_{i,j}^{ePTZ}$ as formula (2), $K_k$ is a perspective matrix of the virtual camera, $R_k$ is the coordinate system from the world coordinate system to the virtual camera:

$$K_k = \begin{bmatrix} \tilde{f}_k & 0 & c_x \\ 0 & \tilde{f}_k & c_y \\ 0 & 0 & 1 \end{bmatrix}, R_k = \Phi\left(\tilde{\theta} \cdot \begin{bmatrix} -\sin(\tilde{\varphi}) \\ \cos(\tilde{\varphi}) \\ 0 \end{bmatrix}\right) \cdot \Phi\left(\tilde{\varphi} \cdot \begin{bmatrix} 0 \\ 0 \\ 1 \end{bmatrix}\right),$$

$$\Phi(q) = I + \frac{\sin(\theta)}{\theta} \cdot 2 \frac{\sin^2\left(\frac{\theta}{2}\right)}{\theta^2} \cdot X^2, \theta = \|q\|,$$

$$X = \begin{bmatrix} 0 & -q_z & q_y \\ q_z & 0 & q_x \\ q_y & q_x & 0 \end{bmatrix}, q = \begin{bmatrix} q_x \\ q_y \\ q_z \end{bmatrix};$$

and the normalized spherical coordinate of the world coordinate system:

$$P_{u,w}^{world} = \begin{bmatrix} \cos(u) \cdot \cos(v) \\ \cos(u) \cdot \sin(v) \\ \sin(u) \end{bmatrix};$$

where $$P_{i,j}^{ePTZ} = \begin{bmatrix} x \\ y \end{bmatrix}$$

is the coordinates of $P_{u,v}$ on the imaging plane of the virtual camera; $\tilde{f}_k$ is used to control zoom of the virtual camera; $c_x$, $c_y$ are the projection center of the virtual camera; u and v are the two-dimensional coordinates of the panoramic image, respectively normalized to [0, 2π], [0, π]; $P_{u,v}$ represents a point mapped from two-dimensional coordinates to three-dimensional coordinates; $q_x$, $q_y$ and $q_z$ are the three components of q; to simplify the formula $R_k$, substituting $$\tilde{\theta} \cdot \begin{bmatrix} -\sin(\tilde{\varphi}) \\ \cos(\tilde{\varphi}) \\ 0 \end{bmatrix} \text{ and } \tilde{\varphi} \cdot \begin{bmatrix} 0 \\ 0 \\ 1 \end{bmatrix}$$

for q; θ only represents a parameter, θ=‖q‖ which has no specific meaning; substituting $$\tilde{\theta} \cdot \begin{bmatrix} -\sin(\tilde{\varphi}) \\ \cos(\tilde{\varphi}) \\ 0 \end{bmatrix}$$

for q in Φ(q), and then obtaining a calculation and derivation method of camera rotation amount $R_k$;

a position of the tracking target can be a rectangular frame $$rect_0 = \begin{pmatrix} p_0 \\ w_0 \\ h_0 \end{pmatrix}$$

of the tracking target, where $$p_0 = \begin{pmatrix} x_0 \\ y_0 \end{pmatrix}$$

represents the rectangular frame center of the initialized position of the tracking target, and $w_0$, $h_0$ represents a width and a height of the rectangular frame of the tracking target, respectively; $x_0$ and $y_0$ are the coordinates of the rectangular frame center of the tracking target;

S2015 specifically comprises:
calculating the position and scale $$\begin{bmatrix} \theta_0 \\ \varphi_0 \\ s_0 \end{bmatrix}$$

of the tracking target in the spherical coordinate system by formula $$P_{u,v}^{world} = R_k^{-1} \cdot K_k^{-1} \cdot P_{i,j}^{ePTZ} \text{ where } s_0 = \frac{f_0}{\alpha}, \alpha = \frac{f_0}{h_0},$$

$s_0$ is the scale of the tracking target currently detected, which can be expressed by a width of the tracking target; $f_0$ is the focal length of the virtual camera; $h_0$ is a height of the rectangular frame; $\tilde{\theta}_k$ is used to control an up-down tilt of the virtual camera; $\tilde{\varphi}_k$ is used to control a left and right movement of the virtual camera; $\tilde{f}_k$ is used to control zoom of the virtual camera; $\tilde{\theta}_0$ and $\tilde{\varphi}_0$ are the initial vertical tilt angle and left and right movement of the virtual camera, respectively; $\theta_k$ and $\varphi_k$ are the calculated spherical coordinate of the tracking target; $\tilde{\theta}_k$ and $\tilde{\varphi}_k$ are the coordinate position of the viewpoint smoothed by the Kalman filter; $\theta_0$ and $\varphi_0$ are the initialized position of the tracking target, $\theta_0=\tilde{\theta}_0$, $\varphi_0=\tilde{\varphi}_0$, that is, the virtual camera is centered on the tracking target at the initialized position.

6. The method of claim 5, wherein S2021 specifically comprises:
converting the cost function $\varepsilon_k = \|\sum_{l=1}^{d} h_k^l \otimes f_k^l - g_k\|^2 + \lambda \sum_{l=1}^{d} \|h_k^l\|^2$ formula (3) of the position tracking model to the Fourier domain: $E_k = \|\sum_{l=1}^{d} H_k^l F_k^l - G_k\|^2 + \lambda \sum_{l=1}^{d} \|H_k^l\|^2$ formula (4), and
calculating a solution $$H_k^l = \frac{\overline{G}_k F_k^l}{\sum_{l=1}^{d} \overline{F}_k^l F_k^l + \lambda}$$

of formula (4) using the gradient descent method; where $f_k^l$ and $F_k^l$ respectively represent the Hog feature and the corresponding Fourier domain feature of a first training sample of the tracking target at frame k; $g_k$ and $G_k$ respectively represent the Gaussian Process Regression matrix and the corresponding Fourier domain feature; d represents the number of samples; $\otimes$ represents convolution; $h_k^l$ and $H_k^l$ respectively represent a correlation filter coefficient and the corresponding Fourier domain feature at frame k; and $\lambda(\lambda \geq 0)$ represents the regularization coefficient, $\overline{G}_k$ represents the complex conjugate of $G_k$; and $\overline{F}_k^l$ represents the complex conjugate of $F_k^l$.

7. The method of claim 6, wherein S2022 specifically comprises:
according to the solution $$H_k^l = \frac{\overline{G}_k F_k^l}{\sum_{l=1}^{d} \overline{F}_k^l F_k^l + \lambda}$$

of the position tracking model, updating the parameters of the position tracking model as follows:

$$A_k^l = (1-\eta) A_{k-1}^l + \eta \overline{G}_k F_k^l$$

$$B_k = (1-\eta) B_{k-1} + \eta \sum_{l=1}^{d} \overline{F}_k^l F_k^l$$

where $A_0^l = \overline{G}_0 F_0^l$, $B_0 = \sum_{l=1}^{d} \overline{F}_0^l F_0^l$ represent the parameters of the position tracking model at frame 0; $A_{k-1}^l$, $B_{k-1}$ represent the parameters of the position tracking model at frame k−1; $A_k^l$, $B_k$ represent the parameters of the position tracking model at frame k; and η represents the learning rate, and represents the model update speed.

8. The method of claim 7, wherein S2023 specifically comprises:
predicting the ePTZ parameters of the next frame using the position of the tracking target at frame k−1, and calculating the plane position $$\begin{bmatrix} x \\ y \end{bmatrix}$$

and the scale $$s_k = \frac{f_k}{\alpha}$$

of the tracking target under the current ePTZ parameters by S2014;
by the following formula:

$$response_k = F^{-1} \left\{ \frac{\sum_{l=1}^{d} A_k^l Z_k^l}{B_k + \lambda} \right\}$$

where λ represents the regularization parameter; both $B_k$ and $A_k^l$ represent the parameters of the position tracking model at frame k (calculated in S2022); d represents the number of samples; $F^{-1}$ represents the Inverse Fourier transform; $Z_k^l$ represents the Fourier transform of the Hog feature of the tracking target area determined by the output position and scale of the ePTZ at frame k; $response_k$ represents a response graph of the tracking target at frame k, that is, the value of each point in the response graph is equal to the similarity between the sample and the tracking target; finding the position with the largest value in the response graph is to find the position most similar to the tracking target; whereby a translational position of the tracking target is: $p_k$=findMax($response_k$).

9. The method of claim 8, wherein S2024 specifically comprises:

by obtaining $f_k^l$ in the formula $\varepsilon_k = \|\Sigma_{l=1}^d h_k^l \otimes f_k^l - g_k\|^2 + \lambda \Sigma_{l=1}^d \|h_k^l\|^2$, that is, obtaining training samples of a scale tracking model according to a scale change to increase or decrease the rectangular frame of the tracking target, and repeating S2021 to S2023 to obtain a scale $s_k$ of the correlation filtering;

a scale change is that while keeping the translational position $p_k$ of the tracking target unchanged, the width and the height of the rectangular frame of the tracking target are multiplied by a coefficient to obtain a new rectangular area as a new sample; calculating a scale change by the following formula:

$$s_i = a^i w + a^i h \quad i \in \left\{ -\frac{s-1}{2}, \frac{s-1}{2} \right\}$$

where, w refers to a width of the rectangular frame of the tracking target, h refers to a height of the rectangular frame of the tracking target, and S represents the number of scales; $\alpha$=1.01 represents a scale factor; calculating a maximum similarity at each scale, and comparing and finding the scale of the maximum similarity as the scale $s_k$ of the current tracking target.

10. A non-transitory computer-readable storage medium that stores one or more computer programs including a set of computer-executable instructions, wherein one or more processors execute the set of computer-executable instructions to perform a method for tracking target in panoramic video method, comprising steps of:

S201, initializing a position and scale of a tracked target in a spherical coordinate system, calculating an electronic pan-tilt-zoom parameter, and mapping a panoramic image to a current electronic pan-tilt-zoom perspective image;

S202, on the basis of a multi-scale correlation filter, performing target tracking on the current electronic pan-tilt-zoom perspective image, and obtaining a new position and scale of the tracked target;

S203, mapping the new position of the tracked target back to the spherical coordinate system; and S204, calculating an electronic pan-tilt-zoom parameter on the basis of the new position and scale of the tracked target in the spherical coordinate system, mapping the same to the current electronic pan-tilt-zoom perspective image, and obtaining a new video frame; then returning to S201 until the panoramic video ends.

11. A panoramic camera, comprising:
one or more processors;
a memory; and
one or more computer programs including a set of computer-executable instructions that are stored in the memory and are configured to be executed by the one or more processors, wherein the one or more processors execute the set of computer-executable instructions to perform a method for tracking target in panoramic video method, comprising steps of:

S201, initializing a position and scale of a tracked target in a spherical coordinate system, calculating an electronic pan-tilt-zoom parameter, and mapping a panoramic image to a current electronic pan-tilt-zoom perspective image;

S202, on the basis of a multi-scale correlation filter, performing target tracking on the current electronic pan-tilt-zoom perspective image, and obtaining a new position and scale of the tracked target;

S203, mapping the new position of the tracked target back to the spherical coordinate system; and S204, calculating an electronic pan-tilt-zoom parameter on the basis of the new position and scale of the tracked target in the spherical coordinate system, mapping the same to the current electronic pan-tilt-zoom perspective image, and obtaining a new video frame; then returning to S201 until the panoramic video ends.

12. The panoramic camera of claim 11, wherein after obtaining a new video frame, the method further comprises the following step of:

S205, performing smoothing on a coordinate point at a center of the video frame by means of a Kalman filter, so as to make an output panoramic video more stable.

13. The panoramic camera of claim 11, wherein S201 specifically comprises steps of:

S2011, initializing a position and scale of the tracking target in a spherical coordinate system;

S2012, rotating a virtual camera to a viewing angle of the tracking target through the electronic pan-tilt-zoom (ePTZ), adjusting the focal length of the virtual camera, and obtaining an initial ePTZ parameter $$\begin{bmatrix} \tilde{\theta}_0 \\ \tilde{\varphi}_0 \\ \tilde{f}_0 \end{bmatrix}$$

which makes the virtual camera center aligned with the initialized position of the tracking target, where $\tilde{\theta}_0$ is used to control a up-down tilt of the virtual camera, $\tilde{\varphi}_0$ is used to control a left and right movement of the virtual camera, and $\tilde{f}_0$ is used to control zoom of the virtual camera;

S2013, according to the initial ePTZ parameter, remapping and transforming the panoramic image to the current ePTZ perspective image;

S2014, in the current ePTZ perspective image, receiving a position of the tracking target manually selected by the user; and S2015, calculating the position and scale of the tracking target in the spherical coordinate system according to the position of the tracking target in the current ePTZ perspective image.

14. The panoramic camera of claim 13, wherein S202 specifically comprises steps of:

S2021, selecting a rectangular frame of the tracking target panning within the area of the tracking target to obtain a predetermined number of training samples to train a position tracking model;

S2022, iteratively updating the parameters of the position tracking model according to the solution of the position tracking model;

S2023, predicting a translational position of the tracking target according to an output position and scale of the current ePTZ and the parameters of the position tracking model;

S2024, obtaining training samples of a scale tracking model according to a scale change to increase or decrease the rectangular frame of the tracking target, and repeating S2021 to S2023 to obtain a scale of the correlation filtering;

S2025, obtaining a new rectangular frame of the tracking target according to the translational position and the scale of the tracking target; and S2026, calculating the new position and scale of the rectangular frame of the tracking target in the spherical coordinate system.

15. The panoramic camera of claim 14, wherein S2013 specifically comprises:

remapping and transforming the panoramic image to the current ePTZ perspective image by formula (1): $P_{i,j}^{ePTZ} = K_k \cdot R_k \cdot P_{u,v}^{world}$, where $P_{i,j}^{ePTZ}$ is the coordinate position of $P_{u,v}^{world}$ mapped to the electronic PTZ perspective image, $P_{u,v}^{world}$ is the three-dimensional coordinates on the unit circle transformed from the panoramic image coordinates $P_{u,v}^{world} = R_k^{-1} \cdot K_k^{-1} \cdot P_{i,j}^{ePTZ}$ as formula (2), $K_k$ is a perspective matrix of the virtual camera, $R_k$ is the coordinate system from the world coordinate system to the virtual camera:

$$K_k = \begin{bmatrix} \tilde{f}_k & 0 & c_x \\ 0 & \tilde{f}_k & c_y \\ 0 & 0 & 1 \end{bmatrix}, R_k = \Phi\left(\tilde{\theta} \cdot \begin{bmatrix} -\sin(\tilde{\varphi}) \\ \cos(\tilde{\varphi}) \\ 0 \end{bmatrix}\right) \cdot \Phi\left(\tilde{\varphi} \cdot \begin{bmatrix} 0 \\ 0 \\ 1 \end{bmatrix}\right),$$

$$\Phi(q) = I + \frac{\sin(\theta)}{\theta} \cdot X + 2\frac{\sin^2\left(\frac{\theta}{2}\right)}{\theta^2} \cdot X^2, \theta = \|q\|,$$

$$X = \begin{bmatrix} 0 & -q_z & q_y \\ q_z & 0 & q_x \\ q_y & q_x & 0 \end{bmatrix}, q = \begin{bmatrix} q_x \\ q_y \\ q_z \end{bmatrix};$$

and the normalized spherical coordinate of the world coordinate system:

$$P_{u,v}^{world} = \begin{bmatrix} \cos(u) \cdot \cos(v) \\ \cos(u) \cdot \sin(v) \\ \sin(u) \end{bmatrix};$$

where $$P_{i,j}^{ePTZ} = \begin{bmatrix} x \\ y \end{bmatrix}$$

is the coordinates of $P_{u,v}$ on the imaging plane of the virtual camera; $\tilde{f}_k$ is used to control zoom of the virtual camera; $c_x$, $c_y$ are the projection center of the virtual camera; u and v are the two-dimensional coordinates of the panoramic image, respectively normalized to $[0, 2\pi]$, $[0, \pi]$; $P_{u,v}$ represents a point mapped from two-dimensional coordinates to three-dimensional coordinates; $q_x$, $q_y$ and $q_z$ are the three components of q; to simplify the formula $R_k$, substituting $$\tilde{\theta} \cdot \begin{bmatrix} -\sin(\tilde{\varphi}) \\ \cos(\tilde{\varphi}) \\ 0 \end{bmatrix} \text{ and } \tilde{\varphi} \cdot \begin{bmatrix} 0 \\ 0 \\ 1 \end{bmatrix}$$

for q; $\theta$ only represents a parameter, $\theta = \|q\|$ which has no specific meaning; substituting $$\tilde{\theta} \cdot \begin{bmatrix} -\sin(\tilde{\varphi}) \\ \cos(\tilde{\varphi}) \\ 0 \end{bmatrix}$$

for q in $\Phi(q)$, and then obtaining a calculation and derivation method of camera rotation amount $R_k$;

a position of the tracking target can be a rectangular frame $$rect_0 = \begin{pmatrix} p_0 \\ w_0 \\ h_0 \end{pmatrix}$$

of the tracking target, where $$p_0 = \begin{pmatrix} x_0 \\ y_0 \end{pmatrix}$$

represents the rectangular frame center of the initialized position of the tracking target, and $w_0$, $h_0$ represents a width and a height of the rectangular frame of the tracking target, respectively; $x_0$ and $y_0$ are the coordinates of the rectangular frame center of the tracking target;

S2015 specifically comprises:

calculating the position and scale $$\begin{bmatrix} \theta_0 \\ \varphi_0 \\ s_0 \end{bmatrix}$$

of the tracking target in the spherical coordinate system by formula $$P_{u,v}^{world} = R_k^{-1} \cdot K_k^{-1} \cdot P_{i,j}^{ePTZ} \text{ where } s_0 = \frac{f_0}{\alpha}, \alpha = \frac{f_0}{h_0}.$$

$s_0$ is the scale of the tracking target currently detected, which can be expressed by a width of the tracking target; $f_0$ is the focal length of the virtual camera; $h_0$ is a height of the rectangular frame; $\tilde{\theta}_k$ is used to control an up-down tilt of the virtual camera; $\tilde{\varphi}_k$ is used to control a left and right movement of the virtual camera; $\tilde{f}_k$ is used to control zoom of the virtual camera; $\tilde{\theta}_0$ and $\tilde{\varphi}_0$ are the initial vertical tilt angle and left and right movement of the virtual camera, respectively; $\theta_k$ and $\varphi_k$ are the calculated spherical coordinate of the tracking target; $\tilde{\theta}_k$ and $\tilde{\varphi}_k$ are the coordinate position of the viewpoint smoothed by the Kalman filter; $\theta_0$ and $\varphi_0$ are the initialized position of the tracking target, $\theta_0 = \tilde{\theta}_0$, $\varphi_0 = \tilde{\varphi}_0$, that is, the virtual camera is centered on the tracking target at the initialized position.

16. The panoramic camera of claim 15, wherein S2021 specifically comprises:

converting the cost function $\varepsilon_k = \|\sum_{l=1}^{d} h_k^l \otimes f_k^l - g_k\|^2 + \lambda \sum_{l=1}^{d} \|h_k^l\|^2$ formula (3) of the position tracking model to the Fourier domain: $E_k = \|\sum_{l=1}^{d} H_k^l F_k^l - G_k\|^2 + \lambda \sum_{l=1}^{d} \|H_k^l\|^2$ formula (4), and calculating a solution $$H_k^l = \frac{\overline{G_k} F_k^l}{\sum_{k=1}^{d} \overline{F_k^l} F_k^l + \lambda}$$

of formula (4) using the gradient descent method; where $f_k^l$ and $F_k^l$ respectively represent the Hog feature and the corresponding Fourier domain feature of a first training sample of the tracking target at frame k; $g_k$ and $G_k$ respectively represent the Gaussian Process Regression matrix and the corresponding Fourier domain feature; d represents the number of samples; $\otimes$ represents convolution; $h_k^l$ and $H_k^l$ respectively represent a correlation filter coefficient and the corresponding Fourier domain feature at frame k; and $\lambda(\lambda \geq 0)$ represents the regularization coefficient, $\overline{G_k}$ represents the complex conjugate of $G_k$; and $\overline{F_k^l}$ represents the complex conjugate of $F_k^l$.

17. The panoramic camera of claim 16, wherein S2022 specifically comprises:

according to the solution $$H_k^l = \frac{\overline{G_k} F_k^l}{\sum_{k=1}^{d} \overline{F_k^l} F_k^l + \lambda}$$

of the position tracking model, updating the parameters of the position tracking model as follows:

$$A_k^l = (1-\eta) A_{k-1}^l + \eta \overline{G_k} F_k^l$$

$$B_k = (1-\eta) B_{k-1} + \eta \sum_{l=1}^{d} \overline{F_k^l} F_k^l$$

where $A_0^l = \overline{G_0} F_0^l$, $B_0 = \sum_{l=1}^{d} \overline{F_0^l} F_0^l$ represent the parameters of the position tracking model at frame 0; $A_{k-1}^l$, $B_{k-1}$ represent the parameters of the position tracking model at frame k−1; $A_k^l$, $B_k$ represent the parameters of the position tracking model at frame k; and η represents the learning rate, and represents the model update speed.

18. The panoramic camera of claim 17, wherein S2023 specifically comprises:

predicting the ePTZ parameters of the next frame using the position of the tracking target at frame k−1, and calculating the plane position $$\begin{bmatrix} x \\ y \end{bmatrix}$$

and the scale $$s_k = \frac{f_k}{\alpha}$$

of the tracking target under the current ePTZ parameters by S2014;

by the following formula:

$$response_k = F^{-1} \left\{ \frac{\sum_{l=1}^{d} A_k^l Z_k^l}{B_k + \lambda} \right\}$$

where λ represents the regularization parameter; both $B_k$ and $A_k^l$ represent the parameters of the position tracking model at frame k (calculated in S2022); d represents the number of samples; $F^{-1}$ represents the Inverse Fourier transform; $Z_k^l$ represents the Fourier transform of the Hog feature of the tracking target area determined by the output position and scale of the ePTZ at frame k; $response_k$ represents a response graph of the tracking target at frame k, that is, the value of each point in the response graph is equal to the similarity between the sample and the tracking target; finding the position with the largest value in the response graph is to find the position most similar to the tracking target; whereby a translational position of the tracking target is: $p_k = \text{findMax}(response_k)$.

19. The panoramic camera of claim 18, wherein S2024 specifically comprises:

by obtaining $f_k^l$ in the formula $\varepsilon_k = \|\sum_{l=1}^{d} h_k^l \otimes f_k^l - g_k\|^2 + \lambda \sum_{l=1}^{d} \|h_k^l\|^2$, that is, obtaining training samples of a scale tracking model according to a scale change to increase or decrease the rectangular frame of the tracking target, and repeating S2021 to S2023 to obtain a scale $s_k$ of the correlation filtering;

a scale change is that while keeping the translational position $p_k$ of the tracking target unchanged, the width and the height of the rectangular frame of the tracking target are multiplied by a coefficient to obtain a new rectangular area as a new sample; calculating a scale change by the following formula:

$$s_i = a^i w + a^i h \quad i \in \left\{ -\frac{s-1}{2}, \frac{s-1}{2} \right\}$$

where, w refers to a width of the rectangular frame of the tracking target, h refers to a height of the rectangular frame of the tracking target, and S represents the number of scales; α=1.01 represents a scale factor; calculating a maximum similarity at each scale, and comparing and finding the scale of the maximum similarity as the scale $s_k$ of the current tracking target.

* * * * *